United States Patent
Christian et al.

(10) Patent No.: US 10,793,293 B2
(45) Date of Patent: Oct. 6, 2020

(54) MONITORING MOBILE AIRCRAFT ACCESSORIES

(71) Applicant: Sell GmbH, Herborn (DE)

(72) Inventors: Nathalie Christian, Schoeffengrund (DE); Alexander Kusch, Herborn (DE); Samuel Klassen, Haiger (DE)

(73) Assignee: SELL GmbH, Herborn (DE)

( * ) Notice: Subject to any disclaimer, the term of this patent is extended or adjusted under 35 U.S.C. 154(b) by 128 days.

(21) Appl. No.: 15/776,175

(22) PCT Filed: May 4, 2017

(86) PCT No.: PCT/EP2017/060670
§ 371 (c)(1),
(2) Date: Jun. 30, 2018

(87) PCT Pub. No.: WO2017/191262
PCT Pub. Date: Nov. 9, 2017

(65) Prior Publication Data
US 2020/0255164 A1    Aug. 13, 2020

Related U.S. Application Data

(60) Provisional application No. 62/331,723, filed on May 4, 2016.

(51) Int. Cl.
*G08B 21/00* (2006.01)
*B64F 5/60* (2017.01)
(Continued)

(52) U.S. Cl.
CPC ............ *B64F 5/60* (2017.01); *B64D 11/0007* (2013.01); *H04W 4/023* (2013.01); *H04W 4/42* (2018.02)

(58) Field of Classification Search
CPC .. B64F 5/60; G08B 21/00; H04Q 5/22; B64D 11/00; B64D 11/0007; B64D 47/00; G06K 19/0723
See application file for complete search history.

(56) References Cited

U.S. PATENT DOCUMENTS 5,999,099 A    12/1999  Stobbe
8,378,825 B2 *  2/2013  Dahms ................... B64D 11/04
                                                       340/572.1
(Continued)

FOREIGN PATENT DOCUMENTS

DE    102007011208 A1    9/2008
DE    202007011208 A     9/2008

*Primary Examiner* — Toan N Pham
(74) *Attorney, Agent, or Firm* — Andrew Wilford

(57) ABSTRACT

The invention relates to a monitoring system (1) for an aircraft for monitoring mobile accessory devices (2) in the aircraft, in particular rolling containers for an on-board kitchen of the aircraft, comprising at least one stationary sensor device (3) for detecting one of the mobile accessory devices (2) and comprising a central unit (10) for evaluating a current security state of the mobile accessory devices (2) based on detection results (DS) of the at least one stationary sensor device (3) reported to the central unit (10). The monitoring system (1) also comprises at least one mobile sensor device (4) for detecting any accessory device (2) of the mobile accessory devices moving relative to the mobile sensor device (4) within a predetermined distance (E), and for reporting a respective detection result (DM) to the central unit (10). In addition, the central unit (10) is designed for evaluating the current security state of the mobile accessory devices (2), taking into consideration the detection results (DM) of the at least one mobile sensor device (4). The invention also relates to a corresponding monitoring method.

15 Claims, 2 Drawing Sheets

(51) Int. Cl.
    *H04W 4/02*     (2018.01)
    *H04W 4/42*     (2018.01)
    *B64D 11/00*     (2006.01)

(56) References Cited

U.S. PATENT DOCUMENTS

| | | | |
|---|---|---|---|
| 9,284,054 B2 * | 3/2016 | Saint-Jalmes | B64D 11/00 |
| 9,403,603 B2 * | 8/2016 | Hozumi | B64D 11/0007 |
| 2006/0186268 A1 * | 8/2006 | Harrington | B64D 11/0007 244/118.5 |
| 2008/0136299 A1 * | 6/2008 | Peurifoy | B64D 11/04 312/237 |
| 2011/0090064 A1 | 4/2011 | Dahms | |
| 2012/0306666 A1 | 12/2012 | Xu | |

\* cited by examiner

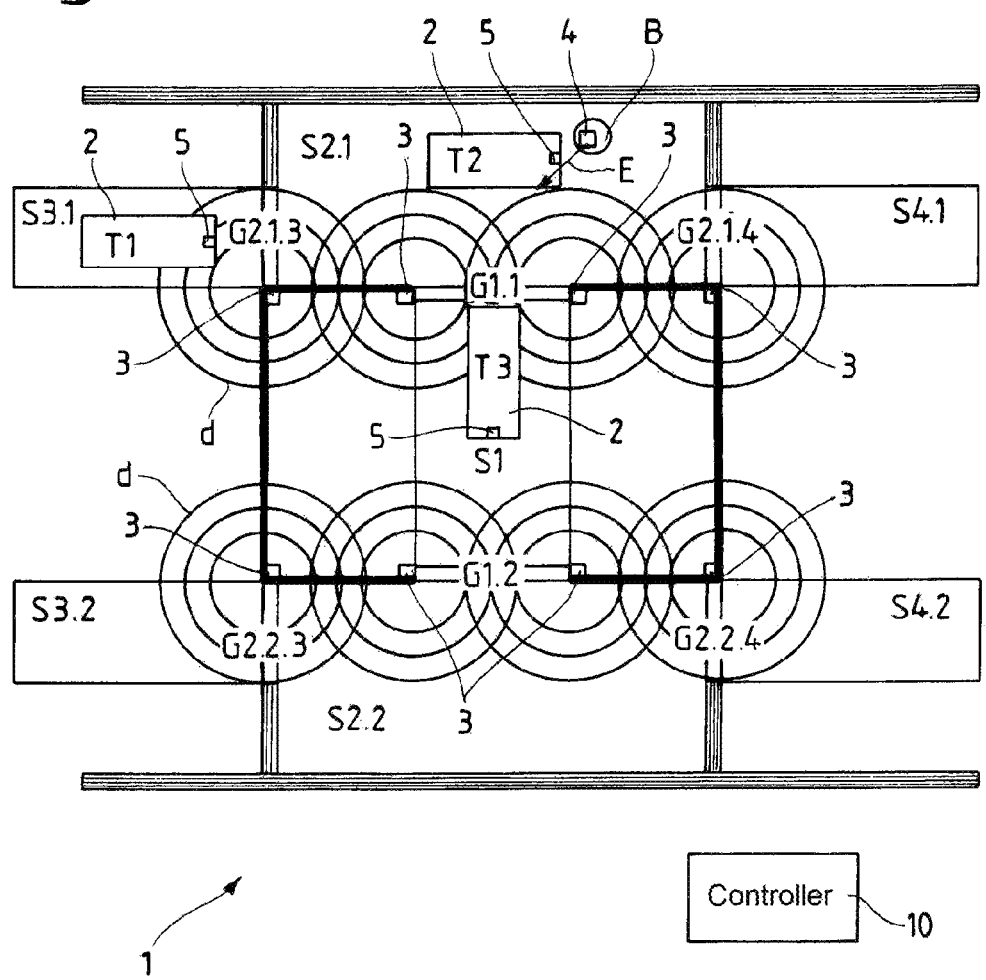

MONITORING MOBILE AIRCRAFT ACCESSORIES

CROSS REFERENCE TO RELATED APPLICATIONS

This application is the US-national stage of PCT application PCT/EP2017/060670 filed 4 May 2017 and claiming the priority of American patent application 62/331,723 itself filed 4 May 2016.

The present invention relates to a system for monitoring mobile accessories in an aircraft, in particular rolling containers for an on-board galley of the aircraft of the type according to the preamble of independent claim 1. The object of the invention is also a method of monitoring mobile accessories in an aircraft according to claim 15.

PRIOR ART

In today's aircraft, particularly in passenger aircraft, mobile accessories, particularly rolling containers also called trolleys, are transported and can be moved during flight of the aircraft, for example by on-board cabin crew in an on-board kitchen, also called a galley, or in aisles of the aircraft. Stowage bins, also called compartments, are provided in the aircraft in the on-board galley for the purpose of holding or safely parking these mobile accessories during critical flight phases, such as during takeoff and landing of the aircraft, but also in case of turbulence.

In order to ensure that the mobile accessories are stowed away in the stowage compartments when not in use, a monitoring system composed of a central controller and stationary sensors is installed in the aircraft. The stowage compartments are each equipped with a stationary sensor that detects whether or not a mobile accessory is in the respective stowage compartment. The detection results of the stationary sensors are reported to the central controller. When a stationary sensor detects that a mobile accessory is accommodated in the associated stowage compartment and reports this detection as a detection result to the central controller, the central controller assesses the security status of this mobile accessory as being secure/secured. Otherwise, the central controller assesses the security status of this mobile accessory as being insecure/not secured. Only when the stationary sensors of all of the stowage compartments monitored by the central controller detect a respective mobile accessory stowed therein and thus report positive detection results to the central controller does the central controller determine the security status of all of the monitored accessories to be secure. This monitoring is good for the takeoff phase of an aircraft but is too inflexible beginning from the moment the mobile accessories have been removed from the stowage compartments by the cabin crew personnel after the takeoff phase.

OBJECT OF THE INVENTION

The object of the present invention is therefore to provide a monitoring system and a method of monitoring mobile accessories in an aircraft that enable more efficient, secure, and flexible monitoring, particularly after the takeoff phase of the aircraft. In addition, it is desirable if the monitoring system and monitoring method is able to inform the on-board cabin crew of current positions of all or at least some of the mobile accessories. Then, if turbulence occurs, the on-board cabin crew could quickly stow the mobile accessories without a possibly protracted search beforehand.

The object of the present invention is achieved by a monitoring system with the features of claim 1 and by a monitoring method with the features of claim 15. Advantageous developments follow from the features of the dependent claims.

The proposed monitoring system for an aircraft, particularly an airplane, for monitoring accessories in the aircraft comprises a central controller and at least one stationary sensor. The at least one stationary sensor is designed to detect a mobile accessory when the mobile accessory is located within a specified zone surrounding the stationary sensor. The at least one stationary sensor is designed to report to the central controller whether or not it has detected a mobile accessory within the specified zone as a detection result. Preferably, the monitoring system comprises a plurality of such stationary sensors. Each of these stationary sensors is fixed at a respective individual location in the aircraft. The mobile accessories can be moved in the aircraft relative to the stationary sensors. The central controller is designed to determine and evaluate a security status of the monitored mobile accessories based on the detection results reported by the stationary sensor(s).

The invention is based on the insight that a mobile accessory can be in a secure state not only when it is accommodated in a stowage compartment but also when it is outside of a stowage compartment, for example when it is being used by cabin crew member. This is the case when the cabin crew member is in sufficient proximity to the mobile accessory to be able to exercise personal control over the mobile accessory.

According to this discovery, it is proposed that, in addition to the stationary sensors, the monitoring system comprise at least one mobile sensor that is designed to detect a mobile accessory from among the mobile accessories to be monitored when that mobile accessory is within a specified distance from the mobile sensor or within a specified zone surrounding the sensor, and to report the detection result to the central controller. It is preferred if a plurality of the at least one mobile sensors are provided in the proposed monitoring system. The at least one mobile sensor is mobile or movable relative to the mobile accessories and is in no way is fixed to one of the mobile accessories during operation of the proposed monitoring system. The at least one mobile sensor can also be moved relative to the stationary sensors. The at least one mobile sensor is intended to be carried by a cabin crew member during flight and particularly while the mobile accessory is being used outside the stowage compartment, for example when serving meals to passengers from the accessory that is a rolling container.

A respective mobile sensor is designed to alternatively detect the presence or absence of a mobile accessory that is located within a specified surrounding zone or within a specified distance from the mobile sensor and is embodied, for example, as an antenna or image capture device. The antenna device is provided in order to detect radiation emitted by a mobile accessory. Furthermore, a respective mobile sensor is designed to wirelessly transmit its detection results by radio to the central controller. The at least one mobile sensor detects the presence of a mobile accessory to be monitored when the mobile accessory is within a specified distance of preferably 5 meters, more preferably 3 meters, and most preferably 1.5 meters from the mobile sensor.

The at least one mobile sensor makes it possible to implement a monitoring system that is more flexibly responsive to the use of the mobile accessories occurring outside of the stowage compartments. Even if not all of the monitored mobile accessories are located within a specified zone surrounding a respective stationary sensor, the central controller does not automatically determine the mobile accessories to have an insecure security status. By means of the at least one mobile sensor, the central controller takes into account whether or not a mobile accessory that is outside the specified surrounding zone a stationary sensor is currently under the control or supervision of a cabin crew member in its assessment of the current security status of the mobile accessories.

A respective stationary sensor is designed to alternatively detect the presence or absence of a mobile accessory that is located within a specified surrounding zone or within a specified distance from the stationary sensor and is embodied, for example, as a detection device for the radio-based, inductive, capacitative, optical, acoustic, and/or mechanical detection of a mobile accessory. Examples of such a stationary sensor include: Antenna, image capture device, optical, thermal, or acoustic proximity switch, contact switch.

The central controller is designed for preferably radio-based reception of detection results of the at least one mobile sensor and for wired and/or wireless reception of detection results of the at least one stationary sensor. The central controller can be configured to request the detection results from the mobile and/or stationary sensors.

The mobile accessories are particularly rolling containers, also called trolleys, that can be moved by on-board cabin crew and are provided for use in an on-board galley of the aircraft and for delivering meals and drinks to passengers of the aircraft by the on-board cabin crew.

In one development of the proposed monitoring system, the at least one stationary sensor is in or on a respective stowage compartment, particularly that of an on-board galley, of the aircraft and is designed to identify and report to the central controller whether or not one of the mobile accessories is in the stowage compartment. The detection by a stationary sensor of a mobile accessory that is present in the stowage compartment corresponds to a mobile accessory that is present or has been detected in a specified zone surrounding the stationary sensor.

In a development of the proposed monitoring system, the central controller is designed to determine that a mobile accessory that is currently detectable by the mobile sensor does not have an insecure security status. The central controller can evaluate the security status of a mobile accessory that is within a specified distance from the mobile sensor or within the specified proximity thereof in an identical manner as the security status of a presence of a mobile accessory that is detected by a stationary sensor, determining it to be secure or secured, or insecure or not secured for example, just as is done for example by on-board cabin crew. The central controller determines the security status of a mobile accessory to be insecure only if there is neither a positive detection result from one of the stationary sensors nor a positive detection result from one of the mobile sensors of the proposed monitoring system for a mobile accessory known to the central controller. A monitoring system that reacts flexibly to different usage scenarios of the mobile accessories is thus provided.

Furthermore, in a development of the proposed monitoring system, the at least one mobile sensor is designed to transmit user information to the central controller that is in or on a current user of the mobile sensor when the mobile sensor detects a mobile accessory within the specified distance. The user information specifies the current user of the mobile sensor at the time the user information was transmitted. Based on the transmitted user information, it is possible to identify the person who is watching over the detected mobile accessory.

Moreover, in a development of the proposed monitoring system a respective mobile sensor is permanently in or on an individual user and is designed to report the user to the central controller. The fixed assignment can be established, for example, by a chip card that can be used in the mobile sensor and is permanently in or on the user. The mobile sensor of the server can also be provided with a biometric detection unit for detecting at least one biometric feature of the individual user, such as a fingerprint or an iris scan. After the initial detection of the biometric feature upon startup of the mobile sensor, the mobile sensor identifies itself or its user to the central controller by transmitting acquired biometric data to the central controller. Since each user is aware that the messages of his mobile sensor can be uniquely associated with him or her, the responsibility and the attention of each user with respect to nearby accessories is heightened. The ability to make each user responsible for the supervision of nearby mobile accessory equipment enhances the responsibility of each user of the mobile sensors and ultimately increases flight safety as well.

Moreover, in a development of the proposed monitoring system, a respective mobile sensor is part of an article of the individual user's clothing. The user is preferably a cabin crew member, and the clothing is preferably that cabin crew member's uniform. Such integration of the mobile sensor into the individual uniform permanently ensures the immediate proximity of the mobile sensor to its user. A mobile sensor that is uniquely associated with a user and is also a garment of this user or is integrated into a garment of the user makes his/her responsibility for a nearby mobile accessory very clear, which ultimately enhances flight safety.

In a development of the proposed monitoring system, the at least one stationary sensor is designed to identify a mobile accessory detected by it and to report the identifying information specifying the identified accessory to the central controller. In a further development of this or in an alternative development of the proposed monitoring system, the at least one mobile sensor is designed to identify a mobile accessory detected by it and to report identifying information specifying the identified accessory to the central controller. In order for a mobile accessory to be identifiable by the stationary and/or mobile sensors, the mobile accessory is provided with a preferably unique identifier. For example, the identifier can be a sticker with an optically readable code, an RFID chip (RFID=Radio Frequency IDentification) that can be read by the sensors, or a code that is sent to the sensor by the mobile accessory to be identified. The central controller is preferably designed to assess the security status of identified mobile accessories that are reported within a specified period of time as being secure, and to assess the security status of mobile accessories that are not detected or reported within the specified period of time but are known to the central controller on the basis of their individual identifying information as being insecure. In this way, the current security status can be determined and/or evaluated individually for each of the monitored mobile accessories. The monitoring system thus provides increased flexibility and evaluative accuracy. In conjunction with the above-mentioned development comprising the transmission of user information identifying a current user of the mobile sensor, the central controller can, on the basis of the user information and identifying information received in the past, determine which user last used a mobile device that is no longer detectable. By inquiring with the last user of the identified accessory about its last known location, the currently undetectable accessory can be quickly located again and secured. The proposed monitoring system thus facilitates and accelerates the locating of mobile accessories that are currently not detectable and are therefore classified as insecure or not secured.

Moreover, in a development of the proposed monitoring system, the at least one mobile sensor is designed to detect a plurality of mobile accessories that are simultaneously located within the specified distance from the mobile sensor and to report the plurality to the central controller. This ensures that, even in the event of a clustering of multiple mobile accessories near a single mobile sensor, each mobile accessory can be monitored by the proposed monitoring system.

In a development of the proposed monitoring system, the central controller is designed to determine the current positions of the mobile accessories in the aircraft. In an embodiment of the monitoring system that is technically easy to implement, the central controller only ascertains the current positions of mobile accessories that are currently detected by the stationary sensors, while taking into account and knowing the fixed positions of the stationary sensors in the aircraft. The locating capabilities of the proposed monitoring system can be improved by the developments listed below.

In a development of the proposed monitoring system, the at least one stationary sensor is designed to detect a current distance between the stationary sensor and the mobile accessory within the specified zone surrounding the stationary sensor and to report the detected distance to the central controller. The stationary sensor can detect or measure the current distance by evaluating a reception strength of a detection signal emitted by the stationary sensor and/or the mobile accessory. The central controller is preferably designed to determine the current positions of the monitored mobile accessories on the basis of the actual distances reported by the stationary sensors. The stationary sensors can be set up such that they form respective detection ports or gates. Preferably, the stationary sensors are arranged such that at least two stationary sensors can simultaneously measure their distance to the same mobile accessory. One suitable arrangement of the stationary sensors as detection gates and/or with overlapping distance measurement zones enables the central controller to be designed as a positioning system for localizing mobile accessories in the overall detection zone of the stationary sensors. In combination with the above-mentioned development with transmission of the identifying information, the current positions can be calculated and tracked individually in the central controller for mobile accessories that are detectable by the stationary sensors.

In a development of the proposed monitoring system, the at least one mobile sensor is designed to transmit its current position in the aircraft to the central controller. Upon detecting the presence of the mobile accessory within the specified distance, the mobile sensor preferably transmits its current position, especially preferably together with the above-mentioned identifying information of the detected mobile accessory, to the central controller. This enables the central controller to detect and monitor the positions of the mobile sensors and mobile accessories. In combination with the above-mentioned developments with the distance measurement by the stationary sensors and the transmission of the identifying information, together with the transmission of the current positions of the mobile sensors to the central controller, a monitoring system with very distinctive locating capabilities is realized.

In a development of the proposed monitoring system, the mobile accessories are designed to report their respective current positions to the central controller. This enables the central controller to precisely locate the monitored mobile accessories. Each mobile accessory can be configured so as to autonomously transmit its current position in the aircraft to the central controller. Alternatively or optionally, each mobile accessory uses the radio communication means of a mobile sensor to transmit its current position when the mobile sensor detects this mobile accessory and reports this to the central controller.

In addition, as a manner of achieving the object of the invention, a method is proposed for monitoring mobile accessories that are in an aircraft, particularly rolling containers for an on-board galley of the aircraft, by the monitoring system proposed above or one of the developments or further developments thereof. In the proposed method, at least one sensor that is fixed stationarily in the aircraft detects one of the mobile accessories. A central controller in the aircraft determines a current security status of the mobile accessory on the basis of detection results from the at least one stationary sensor. Moreover, at least one sensor that can be moved in the aircraft detects, from among the accessories that are located within a specified distance to the at least one mobile sensor, an accessory that can be moved relative to the mobile sensor and reports a respective detection result to the central controller. The central controller evaluates and assesses the current security status of the mobile accessories while taking into consideration the detection results from the at least one mobile sensor. The features presented for the monitoring system proposed above and the developments and further developments thereof can be included in further developments of the proposed method.

The invention includes any and all combinations of the monitoring systems and monitoring methods presented above and developments and further developments thereof.

BRIEF DESCRIPTION OF THE DRAWING

To describe the proposed monitoring system and monitoring method, embodiments will now be described with reference to the figures that follow, in which:

FIG. 2 shows an embodiment of the proposed monitoring system with locating of mobile accessories by stationary sensors.

In the figures, identical or similar components are provided with the same reference symbols throughout.

FIG. 1 shows an embodiment of the proposed monitoring system with detection results from the sensors for different scenarios. The monitoring system 1 in an aircraft has a central controller 10, four stationary sensors 3, and two mobile sensors 4. Four stowage compartments F1, F2, F3 and F4 are provided in an on-board galley of the aircraft for the holding the respective mobile accessories 2. The stowage compartments F1 to F4 are each equipped with one of the stationary sensors 3. Each of the mobile accessories 2 is a user-movable rolling container for the on-board galley and is provided with a signaling device 5 in which unique identifying information T1, T2, T3 and T4 is permanently stored. The central controller 10 is configured to monitor these four mobile accessories T1 to T4 whose identifying information is stored in a memory 11 of the central controller 10. A mobile accessory 2 is detected by one of the sensors 3 and 4 only if the signal device 5 of this mobile accessory 2 is detected by a sensor 3 or 4. Each of the stationary sensors 3 is designed to detect a mobile accessory 2 when it (more specifically: its signal device 5) is within a specified zone d surrounding the stationary sensor 3 or within a specified distance D from the stationary sensor 3. The two mobile sensors 4 are each designed to detect a mobile accessory 2 when it (more specifically: its signal device 5) is within a specified surrounding zone e or within a specified distance E from the mobile sensor 4. In the overall scenario shown in FIG. 1, the mobile sensors 4 are being worn by respective users B1 and B2. Each of the mobile sensors 4 stores retrievable user information identifying the respective user B1 and B2.

Figure 1:
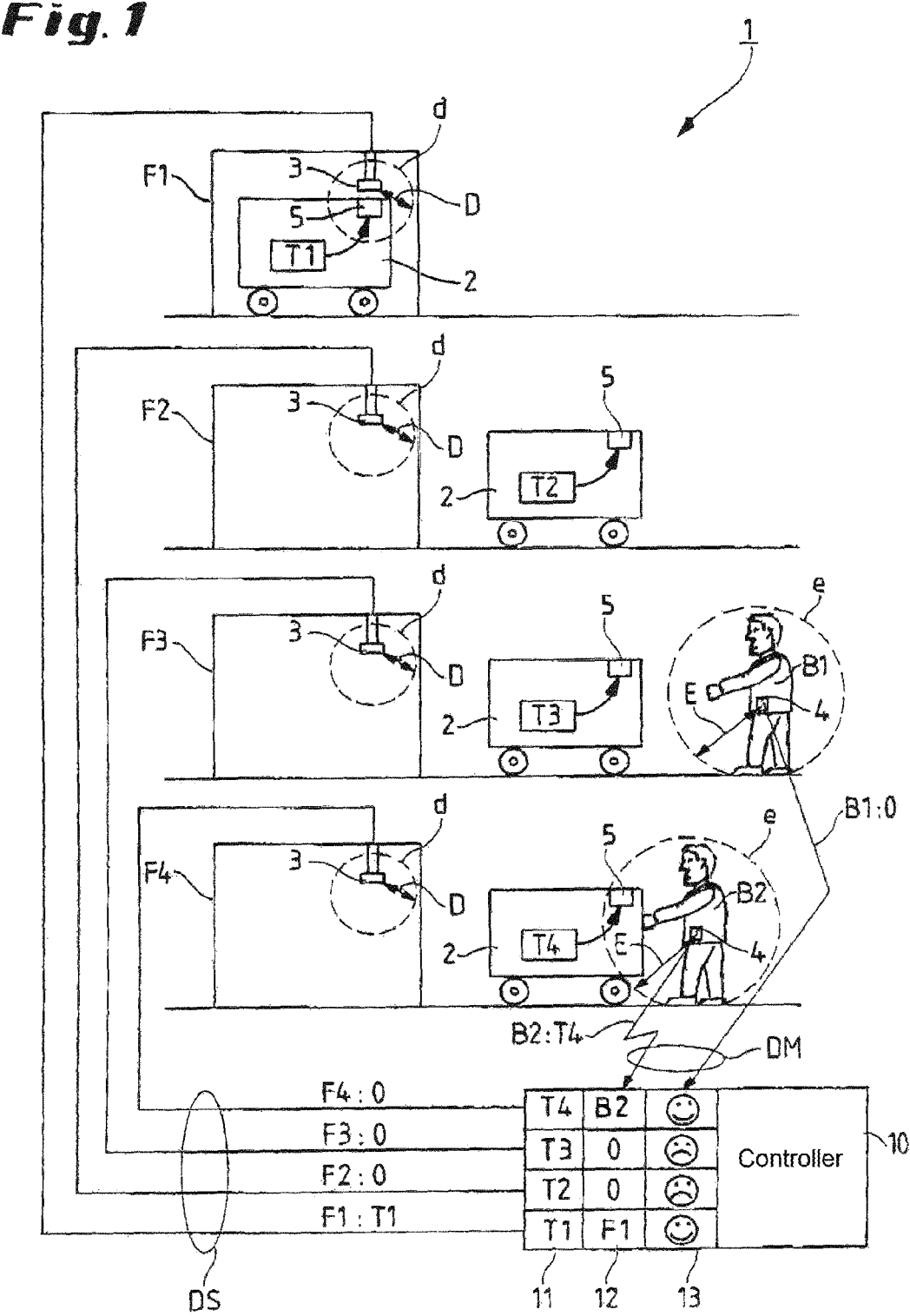
FIG. 1 shows an embodiment of the proposed monitoring system with detection results from the sensors for different scenarios.

The signaling devices 5 of the mobile accessories T1 to T4 are set up as RFID transponders that transmit a radio signal with their identifying information to the requesting sensor in response to a radio signal emitted by a stationary sensor 3 or a mobile sensor 4. In another embodiment, the signal devices 5 are two-dimensional optical codes, QR codes for example, and are read optically by a respective stationary or mobile sensor 3 or 4.

As shown in FIG. 1, one mobile accessory 2 is located only in the stowage compartment F1. The signal device 5 of the mobile accessory 2 is located within the specified surrounding zone d or within the specified distance D, so that the stationary sensor 3 in or on the stowage compartment F1 detects the mobile accessory T1. At the same time, this stationary sensor 3 identifies this mobile accessory 2 by retrieving the identifying information as T1. Consequently, the stationary sensor 3 in or on the stowage compartment F1 and installed therein reports to the central controller 10 by the message "F1:T1" as the detection result DS, which indicates that the mobile accessory T1 is located in the stowage compartment F1. On the other hand, the other three stationary sensors 3 of the stowage compartments F2 to F4 do not detect any mobile accessory 2 in their respective specified surrounding zone d, since the stowage compartments F2 to F4 are empty. Consequently, these three stationary sensors 3 of the stowage compartments F2, F3 and F4 report the respective detection results DS "F2:0," "F3:0," and "F4:0" to the central controller 10. Unlike the proposed monitoring system, a conventional monitoring system would, on the basis of the detection results DS, determine only the mobile accessory T1 accommodated in the stowage compartment F1 to be secure or secured.

As shown in FIG. 1, there is no mobile accessory 2 (more specifically: no signal device 5 thereof) in the surrounding zone e or within the specified distance E of the mobile sensor 4 of user B1. Since this mobile sensor 4 of user B1 does not detect a mobile accessory 2, it reports the detection result DM "B1:0" together with its user information B1. The mobile sensor 4 of user B2 detects the mobile accessory T4 because its signal device 5 is located within the specified surrounding zone e or within the specified distance E of the mobile sensor 4 and identifies it based on the identifying information stored in the signal device 5 as T4. The mobile sensor 4 of user B2 thus transmits the message "B2:T4" as the detection result DM.

After receiving the four detection results DS and DM from the stationary and mobile sensors, the central controller 10 evaluates the current security status of the monitored accessories T1 to T4. To perform the evaluation, the central controller 10 correlates the detection results with the identifying information T1 to T4 stored in the memory 11 of the central controller 10 and stores the correlation in a memory 12 of the central controller 10 and the evaluation in a memory 13 of the central controller 10. During this evaluation, the central controller 10 considers the detection results DM of the mobile sensors 4 with greater priority over or at least equal priority to the detection results DS of the stationary sensors 3 that are monitoring the stowage compartments, in the sense that the central controller 10 only determines the security status of the mobile accessories T2 and T3 to be insecure if no sensor has detected them, but determines the security status of the mobile accessory T4 detected by the mobile sensor 4 and the security status of the mobile accessory T1 accommodated in the stowage compartment F1 to be secure. In contrast, in the conventional solution that is surpassed by this embodiment in terms of flexibility for users and evaluation accuracy, only the security status of the mobile accessory T1 accommodated in the stowage compartment F1 would be determined secure.

FIG. 2 shows an embodiment of the proposed monitoring system with locating of mobile accessories by stationary sensors. The stationary sensors 3 of the monitoring system 1 shown in FIG. 2 are arranged so as to form a port or gate for detecting a mobile accessory 2 passing through this port or gate into a passage from one spatial section Sx to another spatial section Sy of the aircraft. In the example of FIG. 2, the central controller 11 knows that all of the shown mobile accessories T1, T2 and T3 are initially located in section S1. The central controller 10 can track movement of mobile equipment information 2 by current detection results from the stationary sensors 3 and by stored detection results from the stationary sensors 3 from the past and can thus also identify the section Sz in which the mobile equipment information 2 is currently located. For example, on the basis of stored detection results indicating that the mobile accessory T1 of S1 has first passed gate G1.1 and then gate G2.1.3, the central controller 10 is able to identify that T1 is located in section S3.1. Similarly, the central controller 10 can determine that the mobile accessory T2 has been moved starting from S1 to section S2.1 if only detection results from the gate G1.1 are stored. Since the stored detection results of the stationary sensors 3 indicate that the mobile accessory T3 has not yet passed through a gate, the central controller 10 identifies the original section S1 as the zone in which T3 is currently located. This locating of the mobile accessories 2 can be supported or refined by the detection results from the mobile sensor 4 worn by a user B.

LIST OF REFERENCE SYMBOLS

1 monitoring system
2 mobile accessory
3 stationary sensor
4 mobile sensor
5 signaling device
10 central controller
11 memory portion with identifying information
12 memory portion for correlations
13 memory portion for evaluations
B1, B2 user (information)
d, D surrounding zone I distance from the stationary sensor
DM detection results from the mobile sensors
DS detection results from the stationary sensors
e, E surrounding zone or distance from the mobile sensor
F1-F4: stowage compartments
G: Port or gate
S: spatial section
T1-T4: identifying information

The invention claimed is:

1. A system for monitoring mobile accessories in an aircraft, the system comprising:
   a stationary sensor for detecting the mobile accessories;
   a central controller connected to the stationary sensor for evaluating a current security status of the mobile accessories based on detection results from the stationary sensor reported to the central controller; and
   a mobile sensor for detecting, from among the mobile accessories within a specified distance, one of the mobile accessories that is movable relative to the mobile sensor, and for reporting a respective detection result to the central controller, the central controller being designed to evaluate a current security status of the mobile accessories as reported by the stationary sensor to the central controller while taking into consideration the detection results from the mobile sensor.

2. The monitoring system defined in claim 1, wherein the mobile sensor is a device worn by a cabin crew member of the aircraft.

3. The monitoring system defined in claim 1, wherein the stationary sensor is in or on a respective stowage compartment of the aircraft and is designed to detect and report to the central controller whether or not one of the mobile accessories is in the stowage compartment.

4. The monitoring system defined in claim 1, wherein the central controller determines if one of the mobile accessories that is currently detectable by the mobile sensor does not have an insecure security status.

5. The monitoring system defined in claim 1, wherein the mobile sensor transmits user information to the central controller that is associated with a current user of the mobile sensor when the mobile sensor detects one of the mobile accessories within the specified distance.

6. The monitoring system defined in claim 1, wherein the mobile sensor is permanently in or on an individual user and is designed to report the user to the central controller.

7. The monitoring system defined in claim 1, wherein the mobile sensor permanently in or on an individual user is part of a user's clothing.

8. The monitoring system defined in claim 1, wherein the stationary sensor is designed to identify one of the mobile accessories detected by it and to report identifying information specifying the identified accessory to the central controller.

9. The monitoring system defined in claim 1, wherein the stationary sensor identifies one of the mobile accessories detected by it and reports identifying information specifying the identified accessory to the central controller.

10. The monitoring system defined in claim 1, wherein the mobile sensor detects a plurality of the mobile accessories that are simultaneously located within the specified distance from the mobile sensor and reports the plurality of the mobile accessories to the central controller.

11. The monitoring system defined in claim 1, wherein the central controller identifies current positions of the mobile accessories in the aircraft.

12. The monitoring system defined in claim 1, wherein the stationary sensor detects a current distance between the stationary sensor and the mobile accessory within a specified surrounding zone and reports the detected current distance to the central controller.

13. The monitoring system defined in claim 1, wherein the mobile sensor transmits its current position in the aircraft to the central controller.

14. The monitoring system defined in claim 1, wherein the mobile accessories report their respective current positions to the central controller.

15. A method of monitoring mobile accessories in an aircraft by a monitoring system having
   a stationary sensor that is fixed in the aircraft and that detects when any one of the mobile accessories is in close proximity,
   a mobile sensor in the aircraft that can detect any of the mobile accessories within a predetermined distance from the mobile sensor, and
   a central controller in the aircraft and connected to the stationary and mobile sensors,
the method comprising the steps of:
   reporting detection results from the stationary sensor to the controller when the stationary sensor is in close proximity with one of the mobile accessories;
   reporting detection results from the mobile sensor to the controller when the mobile sensor is within the predetermined distance from one of the mobile accessories; and
   detecting with the controller a current security status of the detected mobile accessories on the basis of the detection results from the stationary sensor and from the mobile sensor in the aircraft and evaluating a current security status of the mobile accessories while taking into consideration the detection results of the mobile sensor and of the stationary sensor.

* * * * *